US009336096B2

(12) United States Patent
Pantel (10) Patent No.: US 9,336,096 B2
(45) Date of Patent: May 10, 2016

(54) RETRIEVAL OF DAMAGED PAYLOAD DATA ON A SHINGLED MAGNETIC RECORDING DATA CARRIER

(71) Applicant: Lothar Pantel, Neckargemuend (DE)

(72) Inventor: Lothar Pantel, Neckargemuend (DE)

(73) Assignee: inodyn NewMedia GmbH, Neckargemuend (DE)

( * ) Notice: Subject to any disclaimer, the term of this patent is extended or adjusted under 35 U.S.C. 154(b) by 0 days.

(21) Appl. No.: 14/636,006

(22) Filed: Mar. 2, 2015

(65) Prior Publication Data

US 2015/0254144 A1 Sep. 10, 2015

(30) Foreign Application Priority Data

Mar. 4, 2014 (DE) .......................... 10 2014 003 205

(51) Int. Cl.
*G11B 27/36* (2006.01)
*G06F 11/14* (2006.01)
*G11B 20/12* (2006.01)
*G06F 3/06* (2006.01)
*G06F 12/10* (2016.01)

(52) U.S. Cl.
CPC ............ *G06F 11/1469* (2013.01); *G06F 3/064* (2013.01); *G06F 3/0619* (2013.01); *G06F 3/0676* (2013.01); *G06F 12/10* (2013.01); *G11B 20/1217* (2013.01); *G11B 20/1252* (2013.01); *G06F 2003/0692* (2013.01); *G06F 2212/1032* (2013.01); *G06F 2212/152* (2013.01); *G06F 2212/21* (2013.01); *G06F 2212/657* (2013.01); *G06F 2212/70* (2013.01); *G11B 2020/1238* (2013.01)

(58) Field of Classification Search
None
See application file for complete search history.

(56) References Cited

U.S. PATENT DOCUMENTS

| 7,443,625 | B2 | 10/2008 | Hamaguchi et al. |
| 8,223,458 | B2 | 7/2012 | Mochizuki et al. |
| 8,432,633 | B2 | 4/2013 | Grobis et al. |
| 8,625,215 | B1 * | 1/2014 | Burd ............................... 360/31 |
| 8,693,133 | B1 | 4/2014 | Lee et al. |
| 8,699,185 | B1 | 4/2014 | Teh et al. |
| 8,908,310 | B1 | 12/2014 | Bai et al. |
| 2007/0174582 | A1 | 7/2007 | Feldman |
| 2007/0183071 | A1 * | 8/2007 | Uemura .................... G11B 5/09 360/48 |
| 2011/0304935 | A1 * | 12/2011 | Chang ..................... G11B 5/012 360/48 |
| 2012/0233432 | A1 | 9/2012 | Feldman et al. |
| 2012/0300341 | A1 * | 11/2012 | Matsuo .................. G11B 5/012 360/77.02 |
| 2013/0170061 | A1 | 7/2013 | Saito et al. |
| 2014/0006707 | A1 | 1/2014 | Bandic et al. |
| 2015/0062739 | A1 | 3/2015 | Kumagai et al. |
| 2015/0179214 | A1 * | 6/2015 | Pantel ................ G11B 20/1252 360/48 |
| 2015/0255115 | A1 * | 9/2015 | Pantel ................ G11B 20/1252 360/48 |

* cited by examiner

*Primary Examiner* — Tan X Dinh (57) ABSTRACT

A defect management system for storage devices is disclosed, which may be used in connection with shingled magnetic recording (SMR). Overlapping data tracks, separated by guard regions, are written by a write element whose track width is at least twice as wide as the track width of a read element. Depending on the embodiment, data recovery of a defective track or sector is attained by evaluating the contents of an adjacent track or guard region: if the adjacent track or guard region encompasses equivalent data, due to the width of the write element, this data may be used as a complement or as a substitute for the defective track or sector. This may reduce the risk of data loss. The capacity of a storage device may be increased by balancing out the probability of read errors with the probability that an adjacent track may encompass equivalent data.

23 Claims, 8 Drawing Sheets

| Track # | Config. (u, v) | Status | Taken |
|---|---|---|---|
| 000 (0) | (0,1) | 0 | 1 |
| 001 (1) | (1,2) | 1 | 1 |
| 002 (2) |  | 1 |  |
| 003 (3) | (3,2) | 4 | 0 |
| 004 (4) | (4,3) | 4 | 1 |
| 005 (0) | (0,1) | 0 | 1 |
| 006 (1) | (1,2) | 1 | 1 |
| 007 (2) |  | 3 |  |
| 008 (3) | (3,2) | 3 | 1 |
| 009 (4) | (4,3) | 4 | 1 |
| 010 (0) | (0,1) | 0 | 1 |
| 011 (1) | (1,2) | 0 | 0 |
| 012 (2) |  | 2 |  |
| 013 (3) | (3,2) | 4 | 0 |
| 014 (4) | (4,3) | 4 | 1 |
| 990 (0) | (0,1) | 0 | 1 |
| 991 (1) | (1,2) | 1 | 1 |
| 992 (2) |  | 3 |  |
| 993 (3) | (3,2) | 3 | 1 |
| 994 (4) | (4,3) | 4 | 1 |

*FIG. 7*

| Track # | Config. (u, v) | Status | Taken |
|---|---|---|---|
| 000 (0) | (0,1) | 0 | 1 |
| 001 (1) | (3,2) | 0 | |
| 002 (2) | | 3 | 0 |
| 003 (3) | (2,1) | 3 | 1 |
| 004 (4) | (4,3) | 4 | 1 |
| 005 (0) | (0,1) | 0 | 1 |
| 006 (1) | (1,2) | 1 | 1 |
| 007 (2) | | 2 | 1 |
| 008 (3) | (2,3) | 2 | |
| 009 (4) | (4,3) | 4 | 1 |
| 010 (0) | (0,1) | 0 | 1 |
| 011 (1) | (2,3) | 1 | 1 |
| 012 (2) | | 1 | 0 |
| 013 (3) | (3,4) | 3 | 0 |
| 014 (4) | (1,2) | 4 | |
| ⋮ | | | |
| 990 (0) | (4,3) | 1 | |
| 991 (1) | (2,1) | 1 | 1 |
| 992 (2) | | 2 | 1 |
| 993 (3) | (1,0) | 3 | 1 |
| 994 (4) | (3,2) | 4 | 1 |

1st Band: 000–004
2nd Band: 005–009
3rd Band: 010–014
199th Band: 990–994

RETRIEVAL OF DAMAGED PAYLOAD DATA ON A SHINGLED MAGNETIC RECORDING DATA CARRIER

CROSS-REFERENCE TO RELATED APPLICATION

This application claims priority from German Patent Application DE 10 2014 003 205.1, filed Mar. 4, 2014, the entire disclosure of which is expressly incorporated herein by reference.

TECHNICAL FIELD

The present invention relates to the field of data storage and, in particular, to data recovery in conjunction with storage devices having overlapping data tracks, such as a hard disk drive, operating according to the shingled magnetic recording (SMR) methodology.

BACKGROUND OF THE INVENTION

Common hard disk drives are storage devices comprising disks whose data-carrying surfaces are coated with a magnetic layer. Typically, the disks are positioned atop one another on a disk stack (platters) and rotate around an axis, or spindle. To store data, each disk surface is organized in a plurality of circular, concentric tracks. Groups of concentric tracks placed atop each other in the disk stack are called cylinders. Read/write heads, each containing a read element and a write element, are mounted on an actuator arm and are moved over the spinning disks to a selected track, where the data transfer occurs. The actuator arm is controlled by a hard disk controller, an internal logic responsible for read and write access. A hard disk drive can perform random read and write operations, meaning that small amounts of data are read and written at distributed locations on the various disk surfaces.

Each track on a disk surface is divided into sections, or segments, known as physical sectors. A physical sector, also referred to as a data block or sector data, typically stores a data unit of 512 bytes or 4 KB of user data.

A disk surface may be divided into zones. Zones are regions wherein each track comprises the same number of physical sectors. From the outside inward, the number of physical sectors per track may decrease from zone to zone. This approach is known as zone bit recording.

A computer, or host, accessing a hard disk drive may use logical block addresses (LBAs) in commands to read and write sector data without regard for the actual locations of the physical sectors on the disc surfaces. By means of a hard disk controller the logical block addresses (LBAs) can be mapped to physical block addresses (PBAs) representing the physical locations of sector data. Different mapping techniques for an indirect LBA-to-PBA read and write access are known in the prior art. In some embodiments LBA-to-PBA mapping does not change often. In other embodiments the LBA-to-PBA mapping may change with every write operation, the physical sectors being assigned dynamically.

The storage capacity of a hard disk drive can be increased, inter alia, by reducing the track pitch (i.e., track width) of the concentric tracks on the disk surfaces. This requires a decrease in the size of the read and write elements. However, without new storage technologies, a reduction in the size of the write elements is questionable, as the magnetic field that can be generated is otherwise too small to adequately magnetize the individual bits on the disk surface. A known solution is the shingled magnetic recording methodology, by which a write element writes data tracks in an overlapping fashion. Further information pertaining to shingled magnetic recording (SMR) can be found in U.S. Pat. No. 8,223,458 B2 and U.S. Pat. No. 8,432,633 B2, as well as in patent applications US2013/0170061 A1, US2007/0183071 A1 and US2012/0233432 A1.

With SMR, overlapping data tracks are grouped into bands, which are separated by inter-band gaps, also known as "guard bands," "guard regions," or "guard tracks." Typically, to change the contents of a first track in an already populated band, it is necessary to read out and buffer all subsequent tracks of the band because after updating the data on that first track, rewriting the buffered data up to the next guard region is unavoidable as the wide write element will inevitably overwrite the data of each subsequent track. Such a process is referred to as "read-modify-write" or "write amplification."

Patent application US2007/0174582 A1, entitled "Mutable association of a set of logical block addresses to a band of physical storage blocks," describes how to reduce write amplification by means of mutable mapping between logical block addresses and physical sectors. Essentially, data are stored in the bands in a "fragmented" manner, and the management scheme is configured to identify suitable, empty locations ("holes") where writes can take place quickly. The disclosure of this patent application is hereby incorporated by reference in its entirety.

Sector data read from a physical sector may be subjected to a forward error correction. For this purpose, additional error-correcting codes may be included in the data stored on the physical sector. The hard disk controller may monitor whether physical sectors are poorly legible, e.g., by means of the information derived from the forward error correction. A physical sector that is poorly legible or no longer legible is sometimes called a "bad sector" and will be referred to herein as unreliable or defective sector. If a physical sector is no longer legible, the hard disk controller may report a CRC error.

Hard disk drives may autonomously "repair" defective sectors during regular operation by means of defect management. A defective sector may be replaced by a spare sector from a spare sector area that has been reserved for this purpose. The reference to the spare sector may be stored in a G-list (grown defects list). This is referred to as G-list remapping. Defect management processes may be logged by a monitoring system such as S.M.A.R.T. (Self-Monitoring, Analysis and Reporting Technology).

SUMMARY OF THE INVENTION

Aspects of the present disclosure are directed to storage devices with at least one data carrier surface and at least one write element whose data track width exceeds the track width of a read element by an excess width, such as a hard disk drive operating according to the shingled magnetic recording methodology.

In some embodiments, overlapping data tracks, separated by guard regions, are written by a write element whose track width is at least twice as wide as the track width of a read element. That is, the write element writes a data track on at least two adjacent tracks in a single pass. The storage device may maintain management data containing information whether adjacent or nearby tracks temporarily encompass equivalent data at least on a section.

A novel defect management system is disclosed, which may allow data recovery on the data carrier surface. Depending on the embodiment, data recovery of a defective track or sector is attained by evaluating the contents of an adjacent or nearby track, and/or by evaluating the contents of an adjacent or nearby guard region. This may be done by means of management data and/or similarity comparison. If the adjacent or nearby track, or the adjacent or nearby guard region encompasses equivalent data, due to the width of the write element, these data may be used as a complement or as a substitute for the defective track or sector. This may reduce the risk of data loss.

Furthermore, in some embodiments, a replacement of a defective sector may be attained by placing a guard region onto the physical location of the defective sector. In other embodiments, the capacity of a storage device may be increased by balancing out the probability of read errors with the probability that an adjacent or nearby track may encompass equivalent data.

The aforementioned and many further aspects, variants, objectives, and advantages of the invention will be comprehensible to those skilled in the art after reading detailed descriptions of the embodiments.

BRIEF DESCRIPTION OF THE DRAWINGS

Further features, advantages, and potential applications will be apparent from the drawings. All described and/or illustrated features, alone or in any combination, independent of the synopsis in individual claims, constitute the subject matter of the invention.

DETAILED DESCRIPTION OF THE INVENTION

Figure 1:
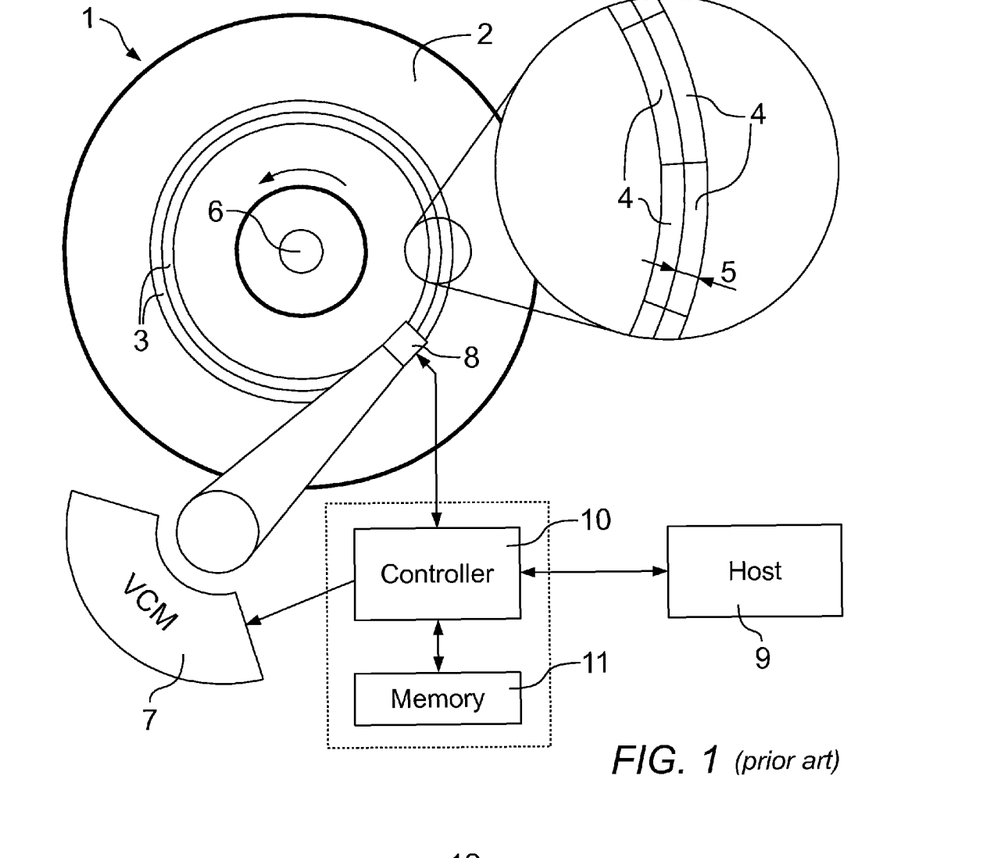
FIG. 1 shows a hard disk drive.

FIG. 1 shows a SMR hard disk drive 1 as an example of a storage device. The disks, with magnetic layers on their disk surfaces 2, spin around the rotational axis of the spindle 6, upon which the individual disks are mounted. Tracks 3 on the disk surfaces 2 are divided into sections, or segments, referred to herein as physical sectors 4, or sectors 4.

To perform read and write operations, the read/write heads 8 are shifted by an actuator arm to the desired track 3. The actuator arm is moved by an actuator 7, typically a voice coil motor (VCM). The actuator 7 is controlled by a hard disk controller 10. The hard disk controller 10 communicates with a host system 9 and has access to a memory, or cache 11. The memory, or cache 11 may contain management data and/or may buffer data of tracks 3 or sectors 4. Furthermore, the disk surfaces 2 may contain special service tracks (service areas) for service needs and to store management data.

Figure 2:
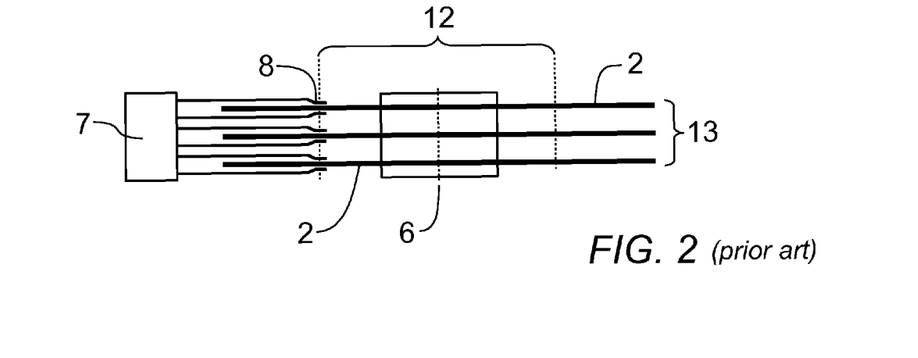
FIG. 2 illustrates the disk stack of the hard disk drive in profile.

FIG. 2 shows a side view of a disk stack 13 (platters), which in this example, comprises three disks, or six disk surfaces 2, as each disk, having upper and lower sides, has two magnetic layers. Cylinder 12 encompasses all concentric tracks 3 that are atop each other in the disk stack 13.

A host system 9, which accesses the SMR hard disk drive 1, may use logical block addresses (LBAs) in commands to read and write sector data without regard for the actual locations of the physical sectors 4 on the disc surfaces 2. LBAs may be mapped to physical block addresses (PBAs) representing the physical sectors 4, that is, the host system 9 may target a specific physical sector 4 using a sequential LBA number, and the conversion to the physical location (cylinder/head/sector) may be performed by the hard disk controller 10. In this process, the geometry of the SMR hard disk drive 1 must be taken into account, such as zones (zone bit recording) and the number of disc surfaces 2.

Different mapping techniques for such an indirect read and write access are known in the prior art. In some embodiments, LBA-to-PBA mapping does not change often. In other embodiments, LBA-to-PBA mapping may change with every write operation as the physical sectors 4 are assigned dynamically. For instance, patent application US2007/0174582 A1, mentioned above, describes such a dynamic association. It is to be explicitly noted that embodiments of the present invention can be implemented using any type of mapping technique, including, but not limited to, dynamic or mutable association of logical block addresses to physical sectors 4.

For shingled magnetic recording, the tracks 3 on the disk surfaces 2 are grouped in bands 15. This is demonstrated in FIG. 3, which shows an enlarged, sectional view of a conventional band 15, comprising eight tracks 3. In the present disclosure, the tracks 3 are numbered by means of track numbers according to the scheme "track #101," "track #102," "track #103," etc. The band 15, consisting of tracks 3 from track #101 through track #108, can be located at any suitable position on a disk surface 2.

The read/write head 8 comprises a write element 16 and a read element 17. In accordance with the principle of shingled magnetic recording, the width of the write element 16 exceeds the width of the read element 17 by an excess width 18. In the particular example, as per FIG. 3, the write element 16 is twice as wide as the read element 17. The arrow 19 indicates the relative direction of motion of the read/write head 8. The write element 16 writes overlapping data tracks 20, which are depicted with a pattern. For illustrative purposes, two different patterns are used to make the overlapping data tracks 20 more distinguishable. Moreover, in the drawings, the sectional view of the data tracks 20 is shown slightly offset along the writing direction 19 so that the overlapping structure is visible. Actual data tracks 20 continue in both directions along their respective tracks 3.

Figure 3:
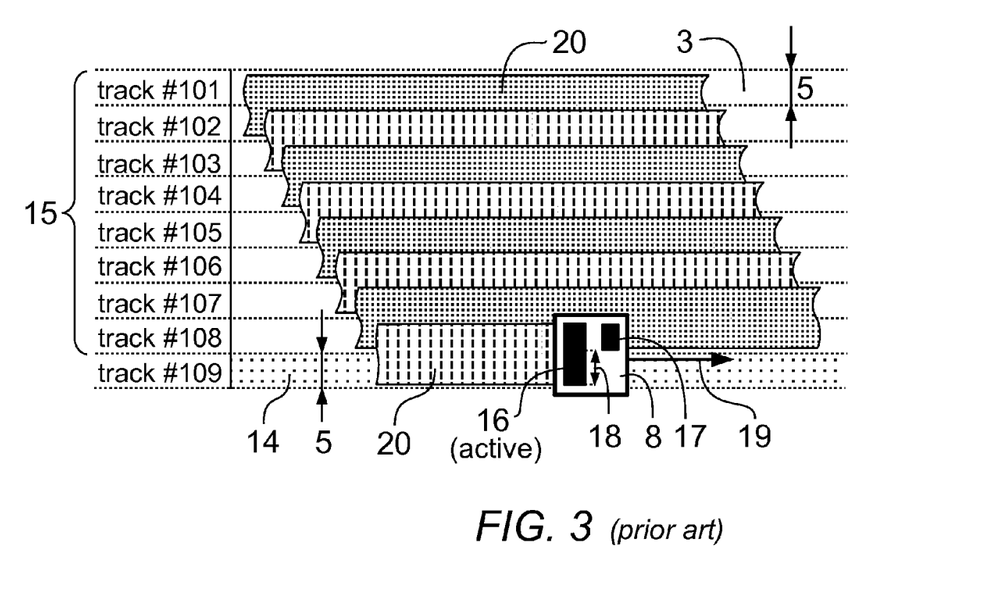
FIG. 3 is an illustration of a conventional band with overlapping data tracks.

Typically, in order to fill a band 15 with data, the write element 16 starts at track #101, that is, the wide write element 16 is positioned on track pair (#101, #102). Next, to get overlapping data tracks 20, the write element 16 is positioned on track pair (#102, #103), etc. By overlapping the data tracks 20, the resulting track width 5 is halved in this case.

Individual bands 15 are separated by inter-band gaps, referred to herein as guard regions 14. FIG. 3 shows a guard region 14 on track #109, marked with a dot pattern. In the illustrated configuration, the guard region 14 occupies a single track 3, referred to herein as a guard track 14. In other embodiments, depending on the excess width 18 of the write element 16, the width of the guard region 14 may also be greater, for example, a multiple of the track width 5.

The guard track 14 is required to close off and delimit the band 15 so that the wide write element 16 does not overwrite any tracks 3 of a subsequent band 15. For instance, to write data on track #108, as shown in FIG. 3, the wide write element 16 is positioned on track pair (#108, #109).

Those skilled in the art will recognize that, if data on the first track 3 of the band 15 (track #101) are to be altered or rewritten, the data on all subsequent tracks 3 up to the guard track 14 must first be read and buffered at a temporary location or in a memory or cache 11, and must finally be rewritten, as the contents of each subsequent track 3 will be destroyed during the writing process. This is referred to as read-modify-write or write amplification.

Figure 4:
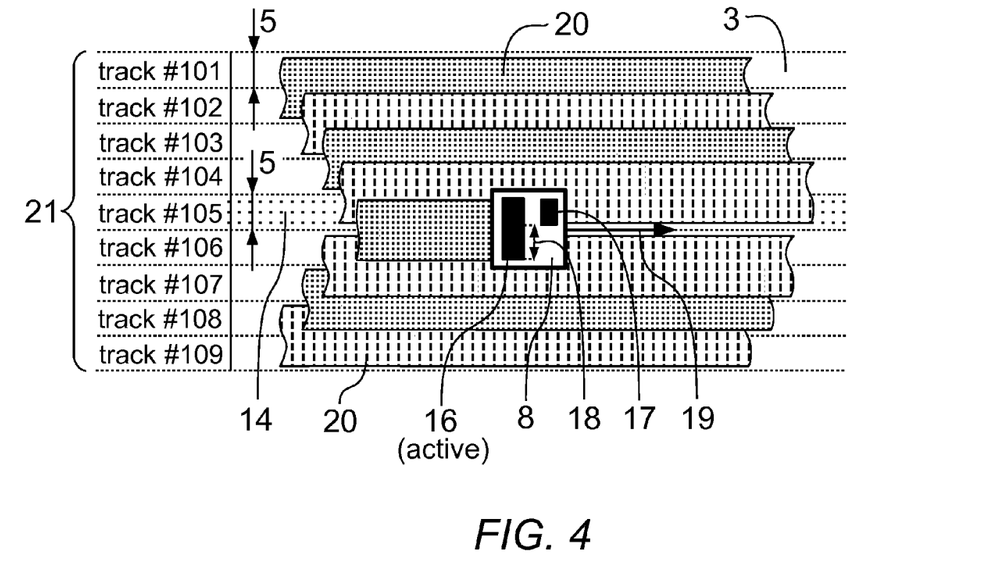
FIG. 4 shows a symmetrical band whose guard region is located in the middle of the band.
Figure 5:
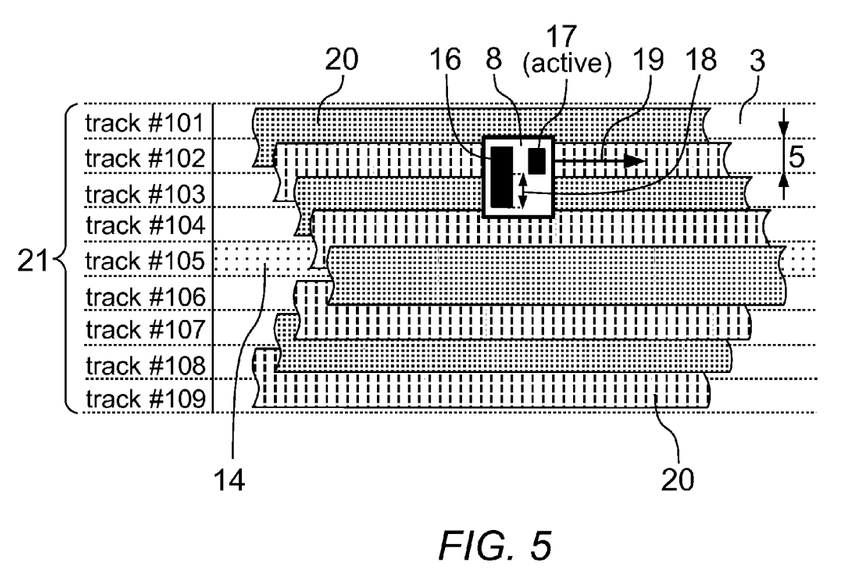
FIG. 5 illustrates how to read data from a track in the symmetrical band.

FIG. 4 and FIG. 5 show a symmetrical band 21, which reduces the maximum write amplification by more than half. A symmetrical band 21 differs from a conventional band 15 in the position of the guard region 14, which is located in or near the middle of the band 21. For structural reasons, the guard region 14 in this case is defined as an integral part of the band 21. A plurality of symmetrical bands 21 can be arranged side-by-side without necessitating an additional gap exist between the band boundaries.

In the specific example shown in FIG. 4 the read/write head 8 and the number of tracks 3 per band 21 correspond to the previous example of a conventional band 15, that is, the write element 16 writes data tracks 20 that are twice as wide as the underlying track width 5, and the band 21 contains eight tracks 3 that can be used to store data. However, in this case, the guard track 14 is located on track #105 and, thus, in the middle of the band 21.

In the case of a symmetrical band 21, the overlapping data tracks 20 may be written on both sides of the band 21, from the outside inward. This results in overlaps in opposite radial directions, symmetrically to the guard region 14. In FIG. 4, the overlapping data tracks 20 show the order in which the individual tracks 3 in the band 21 may be written by the write element 16 to fill the band 21 with data. By way of example, track #101 at the upper band boundary may be written first; next, track #109 at the lower band boundary, then track #102 in the upper half of the band 21, then track #108 in the lower half of the band 21, etc.

The excess width 18 of the write element 16 should always be positioned toward the center of the band 21 so that outer tracks 3 of the band 21, which may already contain valid data, are not overwritten. When writing data on the two innermost tracks 3 of the band 21 (tracks #104 and #106 as per FIG. 4), it is crucial that the write element 16 be positioned such that the excess width 18 is caught by the guard region 14 in both cases. In contrast to that of a conventional band 15 (as per FIG. 3), the guard region 14 of a symmetrical band 21 (as per FIG. 4) is used from both sides of the band 21, that is, the two innermost tracks 3 of the band 21 share a common guard region 14.

In this context, the term "excess width 18 of write element 16" is to be interpreted regardless of the position of the read element 17 within the read/write head 8 and regardless of the corresponding arrow 18 depicted in FIG. 4. E.g., the excess width 18 may be located on either sides of the write element 16, depending on whether the write element 16 writes to a track 3 in the upper or lower half of a band 21.

With continued reference to the situation depicted in FIG. 4, a data track 20 with valid data has been written to track pair (#104, #105) by the wide write element 16. However, since the contents of the guard track 14 on track #105 are irrelevant, the guard track 14 can be overwritten while writing new data on the lower adjacent track #106, that is, the write element 16 is positioned on track pair (#105, #106), as shown in the drawing. Optionally, information about the current status or contents on the guard track 14 may be maintained by the hard disk controller 10, e.g., as part of management data. That is, before writing the depicted data track 20 on track pair (#105, #106), management data would indicate, that the guard track 14 and track #104 encompass equivalent data. After writing the data track on track pair (#105, #106), management data would indicate, that the guard track 14 and track #106 encompass equivalent data.

FIG. 5 shows by way of example how track #102 can be read from a full symmetrical band 21. The read/write head 8 is positioned so that the active read element 17 is located on track #102. The relative direction of motion of the read/write head 8 is indicated with an arrow 19. The read element 17 fits to the width of the tracks 3, i.e., the read element 17 is designed and optimized for the track width 5. This also applies to the effective width of the write element 16, which is designed to write data tracks 20 that are twice the track width 5.

The definition of track width 5 in shingled magnetic recording, as used in the present disclosure, is based on the width of the remaining readable data track 20 after overlapping with an adjacent data track 20. This remaining readable data track 20 constitutes the track 3 for which the read element 17 is designed or optimized.

Physical sectors 4 are sections of a track 3. The terms "sector" and "track" are therefore closely related technically and, depending on the desired embodiment, often equally applicable. Commonly, the umbrella term "track" is also representative of a portion of the track 3 under consideration. Whenever a track 3 is mentioned in the present disclosure, it can also refer to a physical sector 4 that is situated on it. Conversely, if the term "physical sector" is mentioned, the relevant operation may alternatively be applied to the entire track 3, or larger parts of the track 3.

The terms "track" (or "track number") and "cylinder" (or "cylinder number") are likewise closely related technically. Whenever a process is said to take place on a track 3, this may also concern the associated cylinder 12. Conversely, if the term "cylinder" is mentioned, this may imply involvement of at least one of the tracks 3 on the specified cylinder 12.

If a track 3 or band 15, 21 is referred to as "preceding," "above," "upwards," or at an "upper" location, what is meant is that this track 3 or band 15, 21 may be located farther outside on the disk surface 2 and/or may have a smaller track or cylinder number. If a track 3 or band 15, 21 is "subsequent," "below," "downwards," or at a "lower" location, this track 3 or band 15, 21 may be located farther inside on the disk surface 2 and/or may have a greater track or cylinder number. Depending on the embodiment, a reverse orientation (e.g., farther inside instead of farther outside) or a numbering of the tracks 3 and cylinders 12 in the opposite direction may also apply.

In the present disclosure, the term "guard region" is used as an umbrella term for "guard track." A guard track is defined as a guard region consisting of one track 3. As a general term, a guard region may consist of just one track 3 or more than one track 3. Depending on the embodiment, a guard region or guard track may be defined as an integral part of the band 21 or may be defined as a separate instance between two bands 15.

In the present disclosure, the term "defective sector" is used as an umbrella term for a section of a track 3 which is poorly legible, unreliable, no longer legible, or defective. Also, the term "defective section" is used as a generalized term for "defective sector." Whenever a "defective sector" or a "defective section" is mentioned in the present disclosure, such defect may have any severity level. The same applies for the term "defective track."

Figure 6:
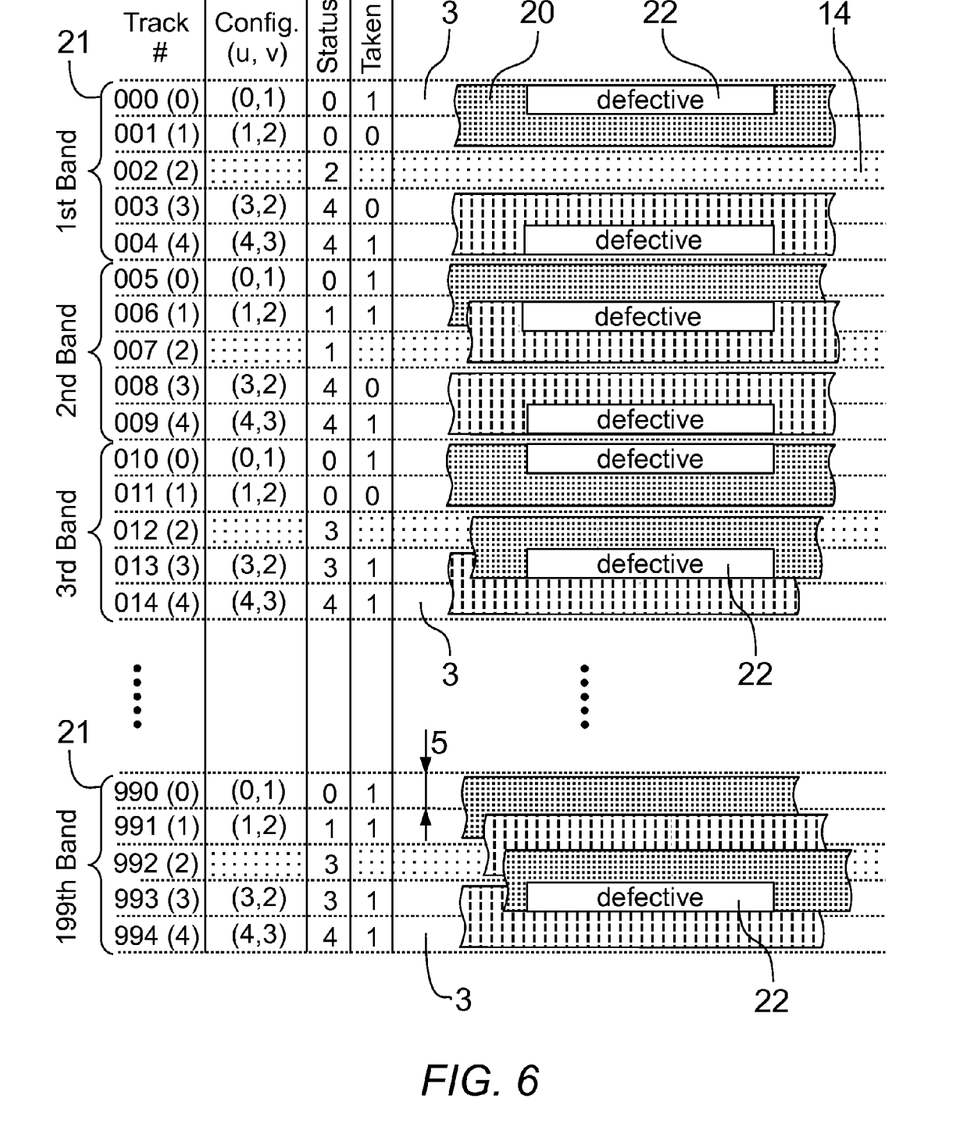
FIG. 6 shows symmetrical bands affected by a first set of exemplary defective sectors. The data tracks are twice as wide as the track width. A data recovery is possible in all cases. (first embodiment)

FIG. 6 through FIG. 9 show a first embodiment. As in the previous examples, a read/write head 8 is used whose write element 16 writes data tracks 20 that are twice as wide as the track width 5. Tracks 3 are grouped into symmetrical bands 21, each comprising four usable tracks 3 and one guard track 14 at the center. In this example, as shown in FIG. 6, a disk surface 2 incorporates 995 tracks, counted from track #000 to track #994, grouped into 199 bands.

For the sake of clarity and to keep the drawings manageable, each disk surface 2 in this embodiment has a very low track count. It is to be expressly noted that actual embodiments may have much larger track counts. Furthermore, it is pointed out that some parts, regions, or sections of the disk surface 2 may be used or reserved for other purposes. It should also be noted that the drawings represent only one disk surface 2. Further disk surfaces 2, if any, may be filled in a comparable or different manner.

With continued reference to FIG. 6, information on the configuration of each band 21 is stored in the "Config. (u, v)" column of the table, and information on the contents of individual physical sectors 4 is maintained in the "Status" column. For this purpose, a local index numbering is established for each band 21. The local index number is indicated in brackets behind the track number. Since, in the first embodiment, each band 21 comprises five tracks 3 (including the guard track 14), each band 21 is numbered from "(0)" to "(4)." For example, "track #009(4)" means that track #009 has the local index number "4" in the 2nd band.

The entries in the "Config. (u, v)" column represent a pair of tracks 3 that specifies a target track 3 and an adjacent track 3 required for the excess width 18 of the write element 16. The values of (u, v) are expressed as local index numbers. The first value "u" of the pair represents the target track 3, i.e., the official position of the sector data. The second value "v" of the pair defines the track 3 that catches the excess width 18 of the write element 16. The second value "v" is always one greater or less than the first value "u". In the initial state, the first value "u" is identical to the local index number of a track 3.

Local index numbers in the "Status" column maintain the official "owner" of written sector data, i.e., a physical sector 4 that is intended to store the written sector data. The "Status" column can be interpreted as a protocol or log of the latest activity of the wide write element 16. For example, as per FIG. 6, a data track 20 has been written to the two physical sectors 4 on track #008 and track #009, and the corresponding status entry has been set to "4" for both physical sectors 4. The status entry "4" is a local index number referring to track #009, and this means that the physical sector 4 on track #008 currently contains the same sector data as the physical sector 4 on track #009. Consequently, the physical sector 4 on track #008 currently does not contain "own" data. If this sector 4 contained "own" data, the status entry would be set to "3", which is the local index number of track #008.

Generally speaking, the wide write element 16 writes a data track 20 on a target track 3 as well as at least on one adjacent track 3, depending on the excess width 18 of the write element 16. In some situations, such an adjacent or nearby track 3 may be used to prevent a loss of data. If a physical sector 4 is unreliable or defective (e.g., "bad sector," CRC error) or if a section of a track 3 is poorly legible (e.g., critical forward error correction), the hard disk controller 10 may evaluate whether a legible version of equivalent data is available on an adjacent or nearby track 3. The availability of such a recovery option depends, inter alia, on the specific occupancy rate of the affected band 15, 21.

The symmetrical bands 21 shown in FIG. 6 are characterized by a variety of empty and taken sectors 4, as indicated in the "Taken" column. Furthermore, the bands 21 are affected by diverse defective sectors 22 (e.g., grown defects). Typically, this would result in read errors and data loss. Yet, the first embodiment is able to recover the data of all depicted defective sectors 22.

For example, the defective sector 22 on track #000 may have a read error that cannot be resolved by means of forward error correction. In the "Status" column, the two adjacent entries with identical value "0" on track #000 and #001 indicate that the inwardly adjacent track 3 on track #001 contains equivalent data and thus can be used to recover the lost data. The read element 17 may perform a seek to track #001 to read equivalent sector data, avoiding a CRC error and data loss.

Data recovery of the remaining defective sectors 22 depicted in FIG. 6 may be performed in a similar manner: the 1st band is filled to half of its capacity (two tracks 3 taken) and is also affected by a second defective sector 22 on track #004. The local index number "4" in the "Status" column indicate that equivalent sector data are available on track #003. The 2nd band is filled to three-quarters of its capacity (three tracks 3 taken) and is affected by two defective sectors 22 on track #006 and track #009. The local index numbers "1" and "4" in the "Status" column indicate that equivalent sector data are available on track #007 and track #008, respectively. The 3rd band is also filled to three-quarters of its capacity (three tracks 3 taken) and is affected by two defective sectors 22 on track #010 and track #013. The local index numbers "0" and "3" in the "Status" column indicate that equivalent sector data are available on track #011 and track #012, respectively. The 199th band depicted in FIG. 6 is full (four tracks 3 taken) and is affected by a defective sector 22 on track #993. The local index number "3" in the "Status" column indicates that equivalent sector data are available on track #992.

Figure 7:
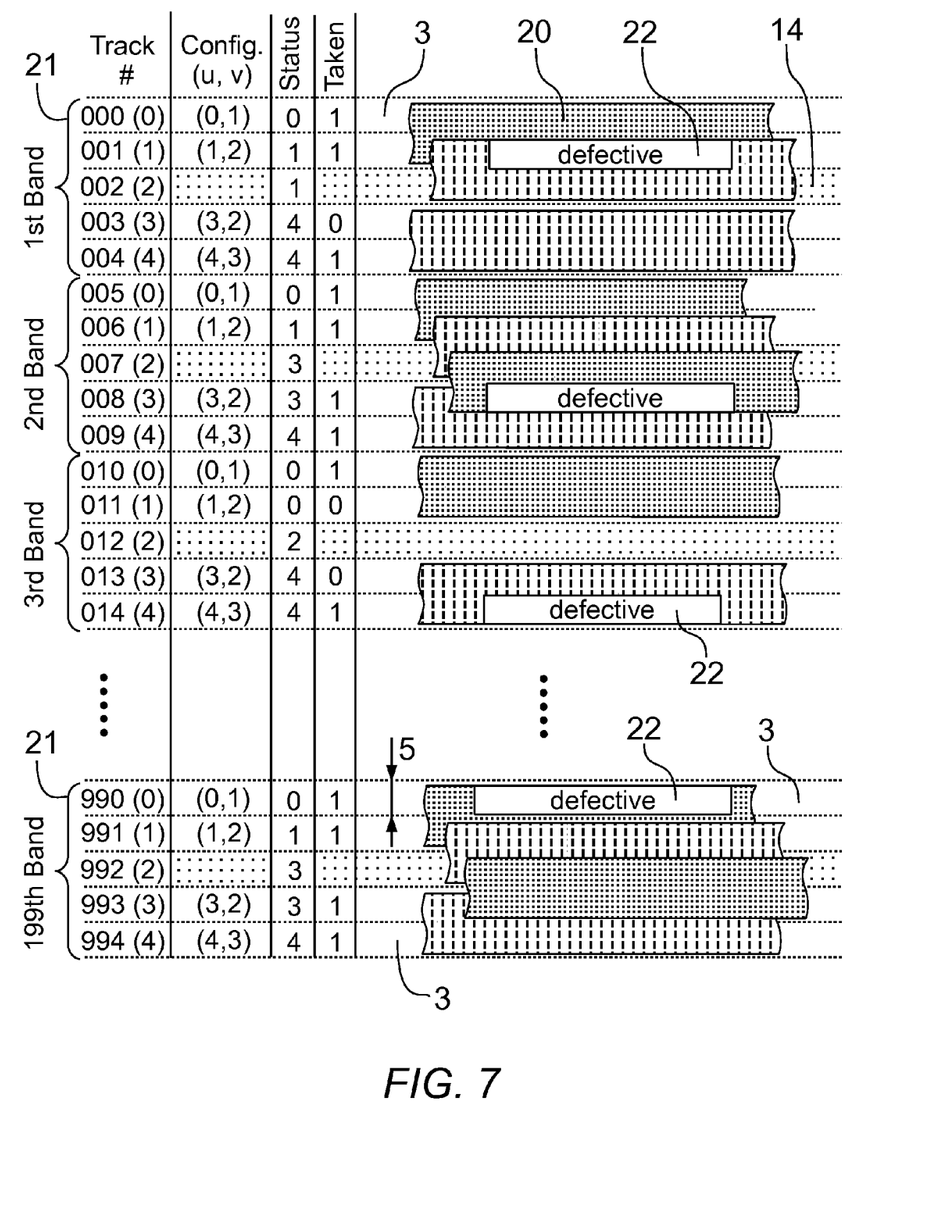
FIG. 7 shows symmetrical bands affected by a second set of exemplary defective sectors. The defective sectors can be replaced in all cases. (first embodiment)

FIG. 7 shows a second example of a disk surface 2 affected by defective sectors 22. The defective sectors 22 are located on track #001 (1st band), track #008 (2nd band), track #014 (3rd band), and track #990 (199th band). In the case of the 1st, 2nd, and 3rd bands, the entries in the "Status" column indicate that it is possible to recover the corrupted data by reading equivalent data from the adjacent tracks #002, #007, and #013, respectively.

However, in the case of the 199th band, it may not be possible to recover the corrupted data of the defective sector 22 on track #990, since no other track 3 of the band 21 contains the same sector data. This is also apparent from the "Status" column: except for the defective sector 22 on track #990, no other sector 4 (on the other track 3 of the band 21) has a status entry with a local index number of "0". The hard disk controller 10 may evaluate the entries in the "Status" column (and/or any other management data), and if a data recovery is not possible, the hard disk controller 10 may issue a conventional CRC error.

Figure 8:
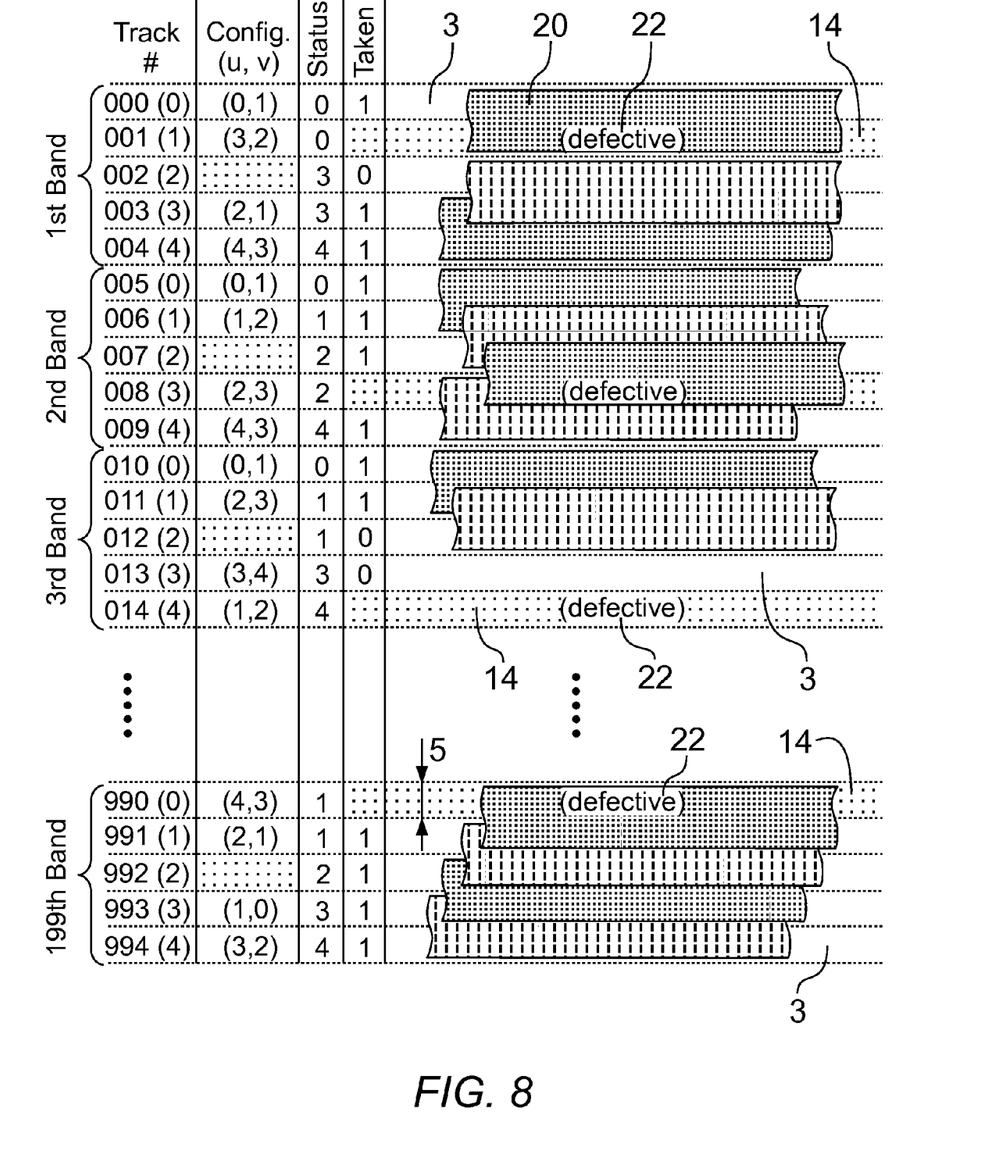
FIG. 8 shows reconfigured bands to replace defective sectors. (first embodiment)

FIG. 8 shows reconfigured bands in which the defective sectors 22 (as per FIG. 7) have been "repaired." To this end, the guard track 14 of each affected band is repositioned onto the track 3 of a defective sector 22.

For example, with continued reference to FIG. 8, in the case of the 1st band, the guard track 14 (originally on track #002) has been moved to the defective sector 22 on track #001. Thus, track #002 can be used to store data and serves as a replacement for the defective track 3. The arrangement of overlapping data tracks 20 within the reconfigured 1st band is adapted to the new location of the guard track 14, which makes it possible to maintain the full number of four tracks 3 per band for data storage. For this purpose, the write element 16 may rewrite the overlapping data tracks 20 of the 1st band in accordance with the new order within the band.

As part of the reconfiguration the entries in the "Config. (u, v)" column are changed, to ensure that the hard disk controller 10 directs the read/write head 8 to the correct tracks 3. For example, as per FIG. 8, the entry (0, 1) in the "Config. (u, v)" column of track #000 indicates that the data of this track 3 remain on track #000 (local index number u="0"), and that track #001 is used to catch the excess width 18 of the write element 16 (local index number v="1"). The entry (3, 2) in the "Config. (u, v)" column of track #001 indicates that the data of this track 3 have been moved to track #003 (local index number u="3") and that track #002 is used to catch the excess width 18 of the write element 16 (local index number v="2").

Figure 9:
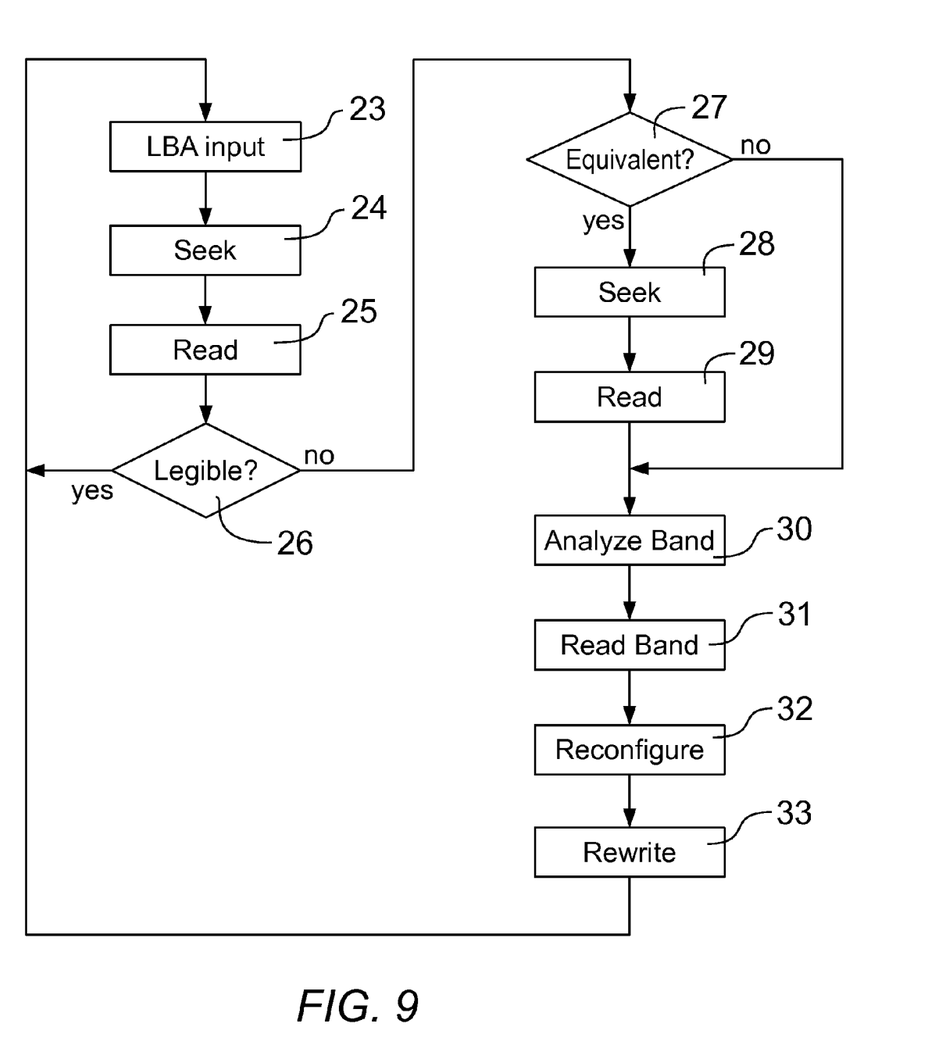
FIG. 9 is a flowchart according to the first embodiment.

FIG. 9 shows a flowchart of the first embodiment. The flowchart illustrates in principle how the hard disk controller 10 may arrange a data recovery after a read error, followed by a reconfiguration of the affected band 21.

In step 23, the hard disk controller 10 receives a read command together with a logical block address of a physical sector 4. The subsequent step 24 positions the read element 17 on the track 3 of the requested physical sector 4 by performing a seek operation, so that the requested sector data can be read in step 25.

If the requested physical sector 4 is legible, the hard disk controller 10 may accept the next read command, as indicated in step 26. Otherwise, if the forward error correction is unable to compensate for defective sector data, it is checked in step 27 by means of management data whether an adjacent track 3 encompasses equivalent sector data (due to the excess width 18 of the write element 16).

For this purpose, the "Taken" flag of the corresponding physical sector 4 on an adjacent track 3 may be checked in step 27. Since the first embodiment uses symmetrical bands 21, the adjacent track 3 is located toward the center of the band 21. If the adjacent track 3 is a guard track 14, checking the "Taken" flag can be omitted. If the "Taken" flag of the corresponding physical sector 4 on the adjacent track 3 has the value "1", the sector 4 typically contains "own" valid data and a data recovery might not be possible. Otherwise, if the "Taken" flag is zero, the entries in the "Status" column may be evaluated. If the status entry of the defective sector 22 is equal to the status entry of the corresponding physical sector 4 on the inwardly adjacent track 3 or guard track 14, it may be possible to recover the corrupted data, which is done in step 28 and step 29. Otherwise, if the values of the status entries are different, a data recovery might not be possible. If data recovery is considered possible, the flowchart continues with step 28, otherwise with step 30.

In order to recover the corrupted data, step 28 positions the read element 17 on the inwardly adjacent track 3 by performing a seek operation so that, in step 29, the required data can be read from the corresponding physical sector 4. This data may then be used to substitute (or complement) the corrupted data.

Optionally, in step 30 through step 33, the affected band 21 may be reconfigured in order to replace the defective sector 22. That is, the guard track 14 is moved onto the position of the track 3 with the defective sector 22 and the arrangement of overlapping data tracks 20 within the band is changed.

Step 30 evaluates the position of the defective sector 22 within the band 21. The four bands 21 depicted in FIG. 7 and FIG. 8 show the four possible locations of the defective sector 22, which is located on either the 1st, 2nd, 4th, or 5th track 3 of a band 21. Depending on the location of the defective sector 22, a different reconfiguration of the band 21 is required. E.g., if the defective sector 22 is located on the 1st or 5th track 3 of the band 21, the overlaps are rearranged in a single radial direction, comparable to a conventional band 15. FIG. 8 depicts this situation for the 3rd and 199th band. If the defective sector 22 is located on the 2nd or 4th track 3 of the band 21, asymmetrical bands are used, as depicted in FIG. 8 for the 1st and 2nd band.

In step 31 of the flowchart (as per FIG. 9), the entire contents of the affected band 21 are read and are buffered at a temporary location or in a memory or cache 11. Subsequently, in step 32, the entries in the "Config. (u, v)" column of the table are changed, in order to adapt to the new arrangement of overlapping data tracks 20 within the band, as laid down in step 30. Finally, in step 33, the buffered data of the affected band are rewritten in accordance with the new entries in "Config. (u, v)". In some cases, depending on the occupancy of the affected band 21, it may be sufficient to read and rewrite only a subset of tracks 3.

Figure 10:
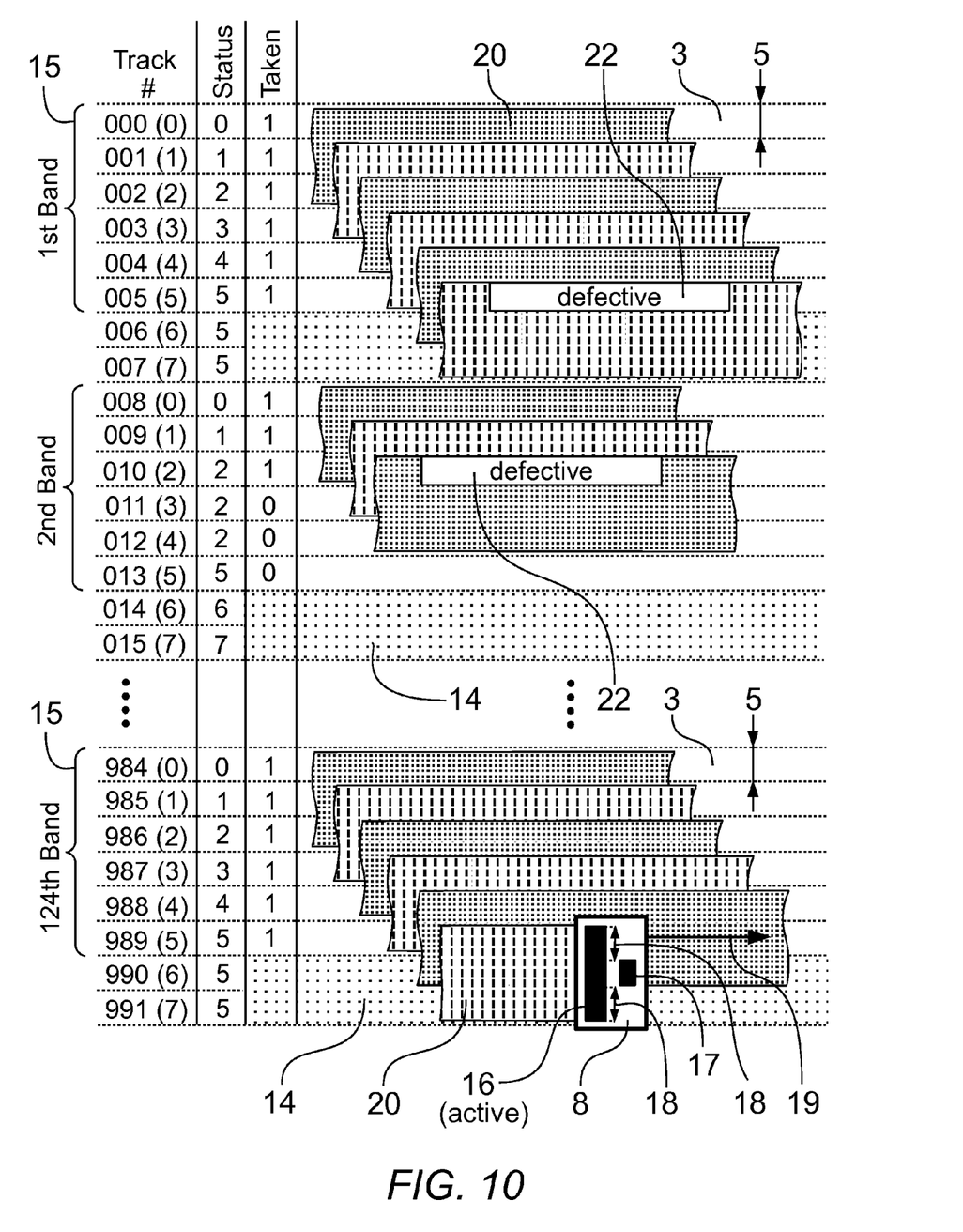
FIG. 10 shows conventional bands affected by two defective sectors. The data tracks are three times as wide as the track width. A data recovery is possible in all cases. (second embodiment)

FIG. 10 shows a second embodiment. Here, the effective track width of the write element 16 is three times as wide as the track width 5 of the read element 17, as can be seen from the read/write head 8 depicted in the drawing. The excess width 18 of the write element 16, as defined in the present disclosure, is the difference between the effective track width of the write element 16 and the track width 5 of the read element 17. Accordingly, with regard to FIG. 10, the excess width 18 is the sum of the length of the two arrows 18 on both sides of the read element 17. Since the write element 16 writes data tracks 20 of triple track width 5, a guard region 14 that covers a width no less than two tracks 3 is required (at least double track width 5).

The second embodiment utilizes conventional bands 15, that is, data tracks 20 that are overlapping in a single radial direction. Six tracks 3 per band 15 may be used for storing data while two tracks 3 per band 15 are required as guard region 14. The disk surface 2 illustrated in FIG. 10 contains 992 tracks, counted from track #000 to track #991, grouped into 124 bands. Local index numbers for each band 15, counted from "(0)" to "(7)," are indicated in brackets behind the track numbers. The "Taken" column indicates whether a physical sector 4 or track 3 is empty or taken.

The write activity of the wide write element 16 is logged in the "Status" column. When writing a new data track 20 on a physical sector 4, the same local index number is stored in three adjacent rows of the "Status" column, since the write element 16 writes data tracks 20 of triple track width 5. From the three tracks 3 that are overwritten by the new data track 20 the local index number for the "Status" column is taken from the uppermost track 3, as the data on this track 3 will remain after writing subsequent, overlapping data tracks 20.

For example, with reference to the situation depicted in FIG. 10, data are added to a sector 4 on track #989 in the 124th band. For this purpose the write element 16 is positioned on the triple set of tracks (#989, #990, #991) to write the data track 20. Since the target track #989 has the local index number "(5)", this value is entered in the "Status" column for all three tracks 3.

FIG. 10 shows an exemplary defective sector 22 on track #010 in the 2nd band. In favor of data recovery, the "Status" column indicates that corresponding sectors 4 on both track #011 and track #012 may encompasses equivalent data, since the values "2" in the "Status" column suggest that the latest write activity on these tracks 3 (at least relevant sectors 4) originates from track #010 with local index number "2." Hence, the corresponding sector data from either track #011 or track #012 (or both) may be used as a substitute (or complement) for the inaccurate data derived from the defective sector 22 on track #010.

Another exemplary defective sector 22 is located on track #005 in the 1st band. The three adjacent values "5" in the "Status" column indicate that corresponding sectors 4 in the guard region 14 on track #006 and track #007 may encompass equivalent data, because the value "5" is the local index number of the defective sector 22 on track #005. Hence, data from either track #006 or track #007 (or both) may be used as a substitute (or complement).

If the write element 16 writes data tracks 20 of triple track width 5 (or more), like in the second embodiment, there may be two (or more) nearby tracks 3 that encompass equivalent data. Therefore, in the event of a read error, and if corresponding sectors 4 on more than one nearby track 3 encompass equivalent data, the hard disk controller 10 may select a nearby track 3 that is most favorable, e.g., in terms of legibility.

Depending on the situation, such as fragmentation or occupancy of the band 15, only a subset of adjacent or nearby tracks 3 may encompass equivalent data. In the case of a full band 15, like the 1st band in FIG. 10, a recovery option may only be available for the last track 3 of the band 15 (by using the data written on the subsequent guard region 14).

In the first and second embodiments, management data, such as the columns "Status" and "Taken," are used to determine whether an adjacent track 3 or a track 3 in the vicinity of the defective sector 22 encompasses equivalent data at least on a corresponding sector 4 (due to the excess width 18 of the write element 16).

Alternatively and/or additionally, in further embodiments, a direct comparison with the contents of adjacent tracks 3 and/or tracks 3 in the vicinity may be carried out. For instance, if a defective sector 22 or a poorly legible section is detected while reading a track 3, the read element 17 may subsequently perform a seek to the next adjacent track 3 in order to read the corresponding sector data from this adjacent track 3. The corrupted data, e.g., raw data, that have been read from the defective sector 22 (or larger parts of the defective track 3) are compared to the corresponding sector data from the adjacent track 3, e.g., by calculating the percentage of matching bits, bytes, other data units, or raw signal. A threshold value may be used to decide whether the corrupted data from the defective sector 22 are sufficiently equal to the corresponding sector data on the adjacent track 3. This may be done to evaluate whether the original contents of the defective sector 22 had been equivalent to the sector data on the adjacent track 3. If the difference is below the threshold value, the sector data on both tracks are considered to be equivalent, and the data from the adjacent track 3 may be used to recover the defective sector 22. Otherwise, if the difference is above the threshold value, it is unlikely that both track sections contain the same data, and data recovery may not be possible.

Depending on the excess width 18 of the write element 16, the read element 17 may also read corresponding sector data from more than one adjacent track 3, that is, from several nearby tracks 3 or any other track 3 in the vicinity of the track 3 affected by the defective sector 22. In this case, the corresponding sector data from these tracks 3 are compared to the data from the defective sector 22 (or larger parts of the defective track 3) in order to find one or more tracks 3 whose relevant sectors 3 may contain equivalent data.

The disclosed alternative embodiments do not necessarily require management data, in which the write activity of the wide write element 16 is logged or maintained, such as the "Status" column and/or "Taken" column of the first and second embodiments. Those skilled in the art will recognize that there is a wide variety of ways and strategies how to compare the contents of defective tracks 3 and nearby tracks 3 or guard regions 14. Various embodiments may be combined and/or varied. Those skilled in the art will therefore choose a suitable embodiment or variant.

The present invention may allow an increase in the effective capacity of the disk surfaces 2 in a SMR hard disk drive 1 by exploiting error tolerances. For example, the recording density or track density may be increased, additional data used for error-correcting codes may be reduced, and/or the forward error correction may be simplified. Increasing the capacity of a disk surface 2 may result in an increased probability of read errors, which is balanced out with the probability that an adjacent track 3 or a track 3 in the vicinity of the defective sector 22 may encompass equivalent data.

Optionally, one or more disk surfaces 2 of the hard disk drive 1 may be divided into areas with overlapping data tracks 20 and areas with conventional, non-overlapping tracks. The areas with conventional, non-overlapping tracks may be used as fast write caches. E.g., while the methods according to the present disclosure may be applied to larger areas with overlapping data tracks 20, conventional caching may be done in smaller areas with non-overlapping tracks.

As for the embodiments presented in this disclosure, the read/write heads 8 used have write elements 16 twice or three times as wide as their respective read elements 17. However, other embodiments may have different width ratios. Furthermore, in some embodiments, the width of a guard region 14 may be equal to the track width 5 or to multiples of the track width 5. Thus, guard regions 14 may fit precisely into the grid of tracks 3. However, in other embodiments, guard regions 14 with different widths may be implemented that are expressly not multiples of the track width 5, but which, for example, are 1.5 times or 2.5 times the width of a track 3. It is to be explicitly noted that the present disclosure is not limited to guard regions 14 consisting of one or two tracks 3. A guard region 14 may have any suitable width. Also, the width of a guard region 14 may be increased to enhance the reliability of stored data.

For illustrative purposes, and to keep the number of depicted tracks 3 and/or physical sectors 4 manageable, all bands 15, 21 or other sections of the disk surfaces 2 shown in the drawings of the present disclosure comprise relatively few tracks 3 and/or physical sectors 4. It is to be expressly noted that actual embodiments may have very large track counts and/or sector counts and that all disclosed methods and devices can be implemented with any number of tracks 3 and/or physical sectors 4.

Each disk surface 2 in the disk stack 13 need not necessarily contain the same number of tracks 3, that is, each disk surface 2 may have its own, individual track count. This shall also apply to the bands 15, 21. Each individual band 15, 21 on a disk surface 2 may comprise a different, e.g., optimized, number of tracks 3.

The embodiments disclosed herein describe the invention based on the example of an SMR hard disk drive 1. All embodiments and further embodiments can, however, also be implemented by means of other data carrier media, which work, by way of example, on magnetic or optical bases. Also, recording data on a data carrier media may be combined with or assisted by other known technologies, such as "Heat-Assisted Magnetic Recording" (HAMR), "Two-Dimensional Magnetic Recording" (TDMR), and/or "Bit Patterned Media" (BPM).

Although the description above contains many specificities, these should not be construed as limiting the scope of the embodiments but as merely providing illustrations of some of several embodiments. Thus, the scope of the embodiments should be determined by the appended claims and their legal equivalents, rather than by the examples given.

The conjunction "or," as used in the claims, shall be interpreted as an alternative between two (or more) features, such as alternative method steps, and shall not be construed to specifically exclude any "non-selected" feature (such as an "XOR" operator). A list of features connected with an or that starts with the phrase "at least" or that ends with the phrase "a combination thereof" covers both single features from the list as well as any groups of features thereof. Furthermore, the conjunction "or," as used in the claims, shall not be construed as a logical OR operator of a computer program: Even if a claim contains a condition, the conjunction or is intended to specify alternative features of the claim such as alternative method steps.

What is claimed is:

1. A method for the retrieval of payload data that are corrupted due to a defective section on a data carrier surface, comprising:
   a) providing a first track and at least a subsequent second track that is adjacent to said first track, said first and second track being located in an area of said data carrier surface that is configured for shingled magnetic recording,
   b) writing a data track on at least a section of said first and second track in a single pass by means of a write element whose data track width covers at least said first and second track, and maintaining management data including the information that at least said first and second track temporarily encompass equivalent data within said section,
   c) reading, at a later stage, data from said section of said first track by means of a read element and evaluating by means of error control the accuracy of the data, and in the event that the data are inaccurate:
   d) determining whether said management data still indicate that at least said first and second track encompass equivalent data within said section, and if this is the case:
   e) reading data from at least said second track by means of said read element,
   f) using at least a part of the data derived from at least said second track as a complement or as a substitute for the inaccurate data derived from said first track.

2. The method of claim 1, wherein said section of said first and second track extends to the entire first and second track.

3. The method of claim 1, wherein:
   a) at least a subsequent third track is located adjacent to said second track,
   b) a data track is written on at least a section of said first, second, and third track in a single pass by means of a write element whose data track width covers at least said first, second, and third track,
   c) said management data include the information that at least said first, second, and third track temporarily encompass equivalent data within said section,
   d) data derived from at least said second track, said third track, or a combination thereof are used as a complement or as a substitute for the inaccurate data derived from said first track.

4. The method of claim 1, wherein said first and second track are members of a plurality of tracks grouped into bands separated by tracks designated as guard regions, wherein, in the event that inaccurate data are read from said first track, it is checked whether at least said subsequent second track is designated as a guard region, and if this is the case, data from at least said guard region are read by means of said read element and are used at least in part as a complement or as a substitute for the inaccurate data derived from said first track.

5. The method of claim 1, further comprising increasing the capacity of said data carrier surface by balancing out the probability that defective sections do occur with the probability that tracks or guard regions adjacent to defective sections encompass, at least in part, equivalent data.

6. The method of claim 1, wherein said first and second track are members of a plurality of tracks grouped into at least one symmetrical band, wherein shingled data tracks, written by said write element, converge inward from both outer boundaries of said symmetrical band, toward a guard region located in the middle or near the middle of said symmetrical band, establishing overlaps in opposite radial directions within said symmetrical band, both tracks adjacent to said guard region being written such that the data track width of said write element is caught by said guard region from both sides.

7. The method of claim 6, further comprising:
   a) displacing said guard region onto the physical location of a defective section located within said symmetrical band,
   b) adjusting the order of shingled data tracks within said symmetrical band, taking into account the new physical location of said guard region,
   c) storing data on at least the former physical location of said guard region.

8. The method of claim 1, wherein:
   a) said section of said first track and said section of said second track each consists of one or more physical sectors,
   b) said first and second track are members of a plurality of tracks on said data carrier surface,
   c) said plurality of tracks are grouped into bands that are separated by tracks designated as guard regions,
   d) said management data are processed by means of a hard disk controller,
   e) said data carrier surface is a disk surface of a hard disk drive that operates according to the shingled magnetic recording methodology.

9. A method for the retrieval of payload data that are corrupted due to a defective section on a data carrier surface, comprising:
   a) providing a first track and at least a subsequent second track that is adjacent to said first track, said first and second track being located in an area of said data carrier surface that is configured for shingled magnetic recording,
   b) writing a data track on at least a section of said first and second track in a single pass by means of a write element whose data track width covers at least said first and second track,
   c) reading, at a later stage, data from said section of said first track by means of a read element and evaluating by means of error control the accuracy of the data, and in the event that the data are inaccurate:
   d) reading data from at least said second track by means of said read element,
   e) comparing data derived from said first track with data derived from at least said second track by means of a decision criterion, and if the data are sufficiently equal:
   f) using at least a part of the data derived from at least said second track as a complement or as a substitute for the inaccurate data derived from said first track.

10. The method of claim 9, wherein said decision criterion is a threshold value and involves to calculate the percentage of matching bits, bytes, raw signal, or a combination thereof at least within a section of said first and second track.

11. The method of claim 9, further comprising reading data from at least one track or guard region located in the vicinity of said first track and using at least a part of the data as a complement or as a substitute if the data are sufficiently equal to the inaccurate data derived from said first track.

12. The method of claim 9, further comprising increasing the capacity of said data carrier surface by balancing out the probability that defective sections do occur with the probability that tracks or guard regions adjacent to defective sections encompass, at least in part, equivalent data.

13. The method of claim 9, wherein said first and second track are members of a plurality of tracks grouped into at least one symmetrical band, wherein shingled data tracks, written by said write element, converge inward from both outer boundaries of said symmetrical band, toward a guard region located in the middle or near the middle of said symmetrical band, establishing overlaps in opposite radial directions within said symmetrical band, both tracks adjacent to said guard region being written such that the data track width of said write element is caught by said guard region from both sides.

14. The method of claim 13, further comprising:
   a) displacing said guard region onto the physical location of a defective section located within said symmetrical band,
   b) adjusting the order of shingled data tracks within said symmetrical band, taking into account the new physical location of said guard region,
   c) storing data on at least the former physical location of said guard region.

15. The method of claim 9, wherein:
   a) said section of said first track and said section of said second track each consists of one or more physical sectors,
   b) said first and second track are members of a plurality of tracks on said data carrier surface,
   c) said plurality of tracks are grouped into bands that are separated by tracks designated as guard regions,
   d) comparing data derived from said first track with data derived from at least said second track is processed by means of a hard disk controller,
   e) said data carrier surface is a disk surface of a hard disk drive that operates according to the shingled magnetic recording methodology.

16. A storage device capable of retrieving payload data that are corrupted due to a defective section on a data carrier surface, comprising:
   a) a first track and at least a subsequent second track that is adjacent to said first track, said first and second track being located in an area of said data carrier surface that is configured for shingled magnetic recording,
   b) a write element whose data track width covers at least said first and second track,
   c) a data track on at least a section of said first and second track written in a single pass by means of said write element, and management data including the information that at least said first and second track temporarily encompass equivalent data within said section,
   d) a read element, and
   e) a control unit configured to:
      i) read data from said section of said first track by means of said read element, wherein the accuracy of the data is evaluated by means of error control, and for the situation that the data are inaccurate, said control unit is configured to:
      ii) determine whether said management data still indicate that at least said first and second track encompass equivalent data within said section, and for the situation that this proves true, said control unit is configured to:
      iii) read data from at least said second track by means of said read element, wherein at least a part of the data is used as a complement or as a substitute for the inaccurate data derived from said first track.

17. The storage device of claim 16, wherein said first and second track are members of a plurality of tracks grouped into bands separated by tracks designated as guard regions, wherein, for the situation that inaccurate data are read from said first track, said control unit further is configured to check whether at least said subsequent second track is designated as a guard region, and for the situation that this proves true said control unit further is configured to read data from at least said guard region by means of said read element, wherein at least a part of the data is used as a complement or as a substitute for the inaccurate data derived from said first track.

18. The storage device of claim 16, wherein said data carrier surface has an increased capacity by exploiting error tolerances such that an increased probability that defective sections do occur is balanced out with the probability that tracks or guard regions adjacent to defective sections encompass, at least in part, equivalent data.

19. The storage device of claim 16, wherein:
   a) said section of said first track and said section of said second track each consists of one or more physical sectors,
   b) said first and second track are members of a plurality of tracks on said data carrier surface,
   c) said plurality of tracks are grouped into bands that are separated by tracks designated as guard regions,
   d) said control unit is a hard disk controller,
   e) said management data are processed by means of said hard disk controller,
   f) said data carrier surface is a disk surface of a hard disk drive that operates according to the shingled magnetic recording methodology.

20. A storage device capable of retrieving payload data that are corrupted due to a defective section on a data carrier surface, comprising:
   a) a first track and at least a subsequent second track that is adjacent to said first track, said first and second track being located in an area of said data carrier surface that is configured for shingled magnetic recording,
   b) a write element whose data track width covers at least said first and second track,
   c) a data track on at least a section of said first and second track written in a single pass by means of said write element,
   d) a read element, and
   e) a control unit configured to:
      i) read data from said section of said first track by means of said read element, wherein the accuracy of the data is evaluated by means of error control, and for the situation that the data are inaccurate, said control unit is configured to:
      ii) read data from at least said second track by means of said read element, wherein data derived from said first track is compared with data derived from at least said second track by means of a decision criterion, and for the situation that the data are sufficiently equal, said control unit is configured to:

iii) use at least a part of the data derived from at least said second track as a complement or as a substitute for the inaccurate data derived from said first track.

21. The storage device of claim 20, wherein said decision criterion is a threshold value and involves to calculate the percentage of matching bits, bytes, raw signal, or a combination thereof at least within a section of said first and second track.

22. The storage device of claim 20, wherein said data carrier surface has an increased capacity by exploiting error tolerances such that an increased probability that defective sections do occur is balanced out with the probability that tracks or guard regions adjacent to defective sections encompass, at least in part, equivalent data.

23. The storage device of claim 20, wherein:
a) said section of said first track and said section of said second track each consists of one or more physical sectors,
b) said first and second track are members of a plurality of tracks on said data carrier surface,
c) said plurality of tracks are grouped into bands that are separated by tracks designated as guard regions,
d) said control unit is a hard disk controller,
e) said data carrier surface is a disk surface of a hard disk drive that operates according to the shingled magnetic recording methodology.

* * * * *